United States Patent

Englar et al.

[15] 3,635,729
[45] Jan. 18, 1972

[54] INSTANT DEHYDRATED HASHED-BROWN POTATOES

[72] Inventors: William J. Englar, Idaho Falls; Donald C. Dew, Shelley, both of Idaho

[73] Assignee: Western Farmers Association, Seattle, Wash.

[22] Filed: Oct. 30, 1969

[21] Appl. No.: 872,774

[52] U.S. Cl. .................................. 99/207, 99/168, 99/100
[51] Int. Cl. ...................... A23b 7/03, A23b 7/16, A23l 1/12
[58] Field of Search ................................... 99/100, 168, 207

[56] References Cited

UNITED STATES PATENTS

| | | | |
|---|---|---|---|
| 3,035,918 | 5/1962 | Sorgenti | 99/100 |
| 3,368,909 | 2/1968 | Moore | 99/168 |
| 3,397,993 | 8/1968 | Strong | 99/193 |
| 3,410,702 | 11/1968 | Frank | 99/207 |
| 3,489,575 | 1/1970 | Johnson | 99/100 |

OTHER PUBLICATIONS

Food Dehydration II, Copley & Van Arsdel Avi Pub. Co., 1964, page 69.

*Primary Examiner*—Norman Yudkoff
*Assistant Examiner*—M. Mullen
*Attorney*—Christensen & Sanborn

[57] ABSTRACT

A potato product in the form of strips, shreds or other pieces which are precooked and dehydrated into a form which may be readily rehydrated in water and browned in oil to form hashed-brown type potatoes. The method of producing the dehydrated hashed-brown potatoes comprises peeling fresh raw white potatoes, trimming and cutting the potatoes into strips, shreds, slivers or other pieces, blanching or precooking the cut potatoes, partially drying the precooked potato pieces, coating the precooked, partially dried potato pieces with starch and dehydrating the coated pieces in a nonagglomerated mass to a moisture content of 20 to 50 percent of the moisture contained in the fresh raw potatoes. The starch serves as a binding agent which upon rehydration of the potatoes causes the pieces to stick together for cooking in the manner of freshly made hashed-brown potatoes to form a cohesive mass which browns uniformly and is pleasing in taste and appearance.

7 Claims, No Drawings

INSTANT DEHYDRATED HASHED-BROWN POTATOES

FIELD OF THE INVENTION

This invention relates to a product comprising dehydrated potatoes and the method of producing the dehydrated potatoes. The product may be rehydrated and cooked in the form of hashed-brown potatoes. This invention further relates to a method of producing dehydrated hashed-brown potatoes and the product thereby wherein cut potato pieces are covered with a suitable starch or equivalent binder agent to aid in causing the pieces of potatoes to stick together for cooking in the manner of freshly made hashed-brown potatoes.

PRIOR ART

It is known in the prior art to prepare hashed-brown potatoes by shredding or grating whole partially or fully cooked potatoes and frying them immediately in their fresh condition or to freeze the partially cooked and grated hashed-brown potatoes for storage prior to final cooking. It is also known to combine various types of potato products in a grated agglomerated mass to form hashed-brown potatoes having improved characteristics. One method of controlling the amount of starch on the surface of "hash browns" is detailed in U.S. Pat. No. 3,410,702 to Frank. The dehydrated hashed-brown product is produced by combining potato strips, which have been prepared by blanching, removing free starch and dehydrating, with a portion of riced potatoes which have been prepared by cooking, ricing and dehydrating the unwashed, riced potatoes. This process results in a product which retains the structure of the potato strips during dehydration and forms a hashed-brown product having desirable properties upon reconstitution in cooking. This process requires separate preparation of two potato products and recombining the two products in order to prepare the desired hashed-brown potato product.

OBJECTS OF THE INVENTION

This invention has as one objective the preparation of a dehydrated potato product which upon rehydration forms a potato material which is adapted to be cooked in oil to form hashed-brown potatoes. This invention further relates to a process for preparing dehydrated potato product formed by a unique combination of partially cooked potatoes with a starch material derived from another source. The potato pieces which are coated with starch are then dehydrated to form the product of the instant invention.

SUMMARY OF THE INVENTION

The present invention is a process for producing an instant dehydrated, shredded or southern style hashed-brown potato mix of superior quality, uniformity and texture by utilizing potato strips, shreds, slivers or pieces, which are coated or mixed with starch or other naturally occurring or synthetic binding agents that function by binding the potato pieces together during rehydration and cooking. The starch functions principally by making the rehydrated product stick or adhere together in a normal manner during browning and eating.

The present invention is accomplished by following a series of processing steps which may be generally described as follows: fresh raw white potatoes are peeled, trimmed, cut into strips, shreds, slivers, pieces or the like and blanched or precooked. The potatoes are preferably cut into a size, which may be referred to as a strip, which prior to dehydration has dimensions of approximately one-half inch to 1½ inch in length, about one-fourth to one-half inch in width and from about one-sixteenth inch to one-eighth-inch thick, or of various shapes having at least one dimension of substantially less than one-half inch so that uniform and adequate drying may be accomplished by ordinary techniques. The pieces are blanched or precooked for a time sufficient to destroy the peroxidase present. A balancing time of from 5 to 10 minutes is usually required in water which contains a salt such as sodium chloride, sodium acid pyrophosphate or a combination thereof at a temperature of 180° up to the boiling temperature. The resulting precooked strips or potato pieces are then partially dehydrated by use of known apparatus such as moving belt dehydrators and tray dehydrators, or by use of fluidized bed techniques. The precooked and partially dehydrated potato pieces or strips are then coated with a starch solution or dusted with powdered starch to coat the outer surface of potato strips or pieces. A starch solution having a concentration of 5 to approximately 25 percent starch is used in this invention. This solution contains water soluble or pregelled starches which require no cooking in preparation, or raw starch from the peeling and washing stages of potato-processing industries may be used. To prepare a solution from raw, dried starch, the powdered starch is suspended by agitation in cold water. The agitation is maintained as the water temperature is raised to cook and gel the starch. The starch solution as prepared above is sprayed on the dried potato strips which are turned and mixed during this spraying operation in such a manner that all strips are uniformly coated. An adequate amount of starch to make the strips adhere during rehydration, browning and eating is applied in the above manner. Alternately, powered starch may be applied to the potato strips in an amount adequate to cause adherence of the strips during rehydration. Normally between 4 and 10 percent of starch on a dry weight basis of the weight of the dehydrated potato product is sufficient to bind the rehydrated potatoes. However, the amount of starch added to the potato pieces will vary according to the viscosity of the starch solution; that is, a starch solution which has a low viscosity will be added to the potato strips being treated in larger quantities than starch solution which has a high viscosity.

When the potato pieces have been treated with the starch solution, they are subjected to drying and further dehydration using a fluidized bed dryer or other method to keep the product from sticking and fusing together. To increase the color intensity and eye appeal of the cooked hashed-brown product, dextrose is applied along with the starch solution. Other spices and treating agents may be used to enhance the appearance, flavor and shelf life of the dried product. The dehydrated, starch-coated product is then packaged in convenient packages for use by the consumer.

In preparing the dehydrated, starch-coated strips for consumption, the product is placed in boiling water which rehydrates the potatoes and gels the starch to bind strips in the manner of fresh, hashed potatoes. The rehydrated product is then browned in an oil grill or skillet and served.

The dehydrated and starch coated hashed-brown potato product does not require costly refrigerated transportation or storage and is unaffected by temperature fluctuations normally encountered in storage of foodstuffs. The dehydrated product is therefore less expensive to transport and store than fresh or frozen hashed-brown potatoes.

The reconstitution ratio of the dehydrated, starch-coated hashed-brown potato product is great enough to make the cost per serving competitive with the fresh or frozen product. When prepared in the manner specified above, 1 pound of the dehydrated product of the process of this invention will yield, when rehydrated, approximately 3 pounds of reconstituted hash browns thus offsetting to a large degree the higher cost per pound of the dehydrated product.

The process and product of this invention will be more readily apparent from an evaluation of the following examples:

EXAMPLE I

Fresh raw white potatoes were peeled and shredded into shapes typically used in preparation of hashed-brown potatoes. The shreds were blanched for 10 minutes in water held at a temperature of 200° F. and containing 1 pound of sodium chloride for each 10 gallons of water. After 10 minutes precook, the potato shreds were removed and dehydrated on a moving belt dehydrator, to a moisture content of 20–30 percent. A starch solution having a concentration of 25 percent was prepared by adding raw starch to cold water and cooking the starch to the gelled stage. This starch solution was sprayed onto the potato product which was turned and mixed during the spraying operation to uniformly coat the strips. The starch was applied to the precooked and partially dehydrated potato strips in an amount such that the product contained approximately 8 percent by weight of the starch on a dry weight basis. The potato pieces were then introduced into a fluidized bed dryer and dried and dehydrated to a total moisture content of approximately 7.5 percent. The fluidized bed dryer kept the product from sticking and fusing together. The product was then packaged for sale to the consumer.

EXAMPLE II

Fresh whole white potatoes were peeled, trimmed and cut into strips having dimensions of approximately one-half to 1½ inch in length, one-fourth to one-half inch wide, and one-sixteenth to one-eighth-inch thick. The strips were washed to remove surface starch and blanched or precooked in a manner described in example I. The precooked potato product was then dehydrated in a moving belt dehydrator to a moisture content of 20–30 percent. The precooked and dehydrated potato strips were then moistened on the surface and dusted with dry starch in an amount equivalent to 6 percent by weight of the finished product. The product was then further dried in a fluidized bed dryer to a moisture content of approximately 7.5 percent. The product was packaged for sale to the consumer.

EXAMPLE III

The process of example I was followed using a starch solution containing 15 percent starch by weight with 5 percent by weight dextrose added to improve the frying characteristics, color and appeal of the cooked product.

In each of the above examples, the product was prepared for cooking and eating by the following steps: the dehydrated, starch-coated strips were placed in boiling water to dehydrate the potato and gel the starch to bind the strips in the manner of fresh hash-brown potatoes. An adequate amount of water was used to return the reconstituted potatoes to the approximate moisture content of fresh potatoes. In each case, the product was rehydrated in less than 5 minutes, and was in that condition suitable for cooking and consumption. The rehydrated product was then browned in the oiled grill or skillet, and served. The taste, appearance, texture and aroma were found to be equivalent to freshly prepared hash browns.

We claim as our invention:
1. A process for manufacturing a dehydrated potato product from fresh potatoes comprising:
   dividing the potatoes into potato segments;
   precooking the potato segments in water for a time sufficient to destroy peroxidase present in said potato segments;
   partially drying said potato segments;
   coating said potato segments with starch; and
   further drying said starch coated potato segments in a nonagglomerated mass whereby a dried starch coated potato product is obtained suitable for rehydration and agglomeration upon exposure to water for subsequent frying to form hashed-brown potatoes having the flavor, texture and appearance of freshly prepared hashed brown potatoes.
2. The process of claim 1 wherein said starch is chosen from the group consisting of powdered starch, raw starch, water-soluble starch and pregelled starch.
3. The process of claim 1 wherein said starch is applied as an aqueous solution.
4. The process of claim 1 wherein said starch is applied as a powder.
5. The process of claim 1 wherein said step of partially drying said potato segments results in potato segments having a moisture content of 20 to 30 percent.
6. The process of claim 1 wherein said step of further drying results in a potato product having a moisture content of about 7.5 percent.
7. The process of claim 1 wherein the potato segments are dried in a fluidized bed.

* * * * *